United States Patent

Webster

[15] 3,689,057
[45] Sept. 5, 1972

[54] AUTOMOBILE BODY WORKTABLE

[72] Inventor: Burton E. Webster, 6 Thorpe Ave, St. Albans, Vt. 05478

[22] Filed: Sept. 11, 1970

[21] Appl. No.: 71,496

[52] U.S. Cl. .................................. 269/17, 269/60
[51] Int. Cl. ........ B23q 37/00, B23q 3/18, B25h 5/00
[58] Field of Search .................................. 269/17, 60

[56] References Cited

UNITED STATES PATENTS

| | | | |
|---|---|---|---|
| 2,311,668 | 2/1943 | Kennedy | 269/17 X |
| 2,161,578 | 6/1939 | Johnson | 269/17 X |
| 3,028,835 | 4/1962 | Rodriguez | 269/17 X |
| 2,370,019 | 2/1945 | Dougherty | 269/17 X |
| 2,904,308 | 9/1959 | Vergara | 269/17 X |
| 2,990,171 | 6/1961 | Grove | 269/107 |

*Primary Examiner*—Wayne A. Morse, Jr.
*Attorney*—Jones and Lockwood

[57] ABSTRACT

This disclosure relates to a worktable for use in supporting damaged automobile body parts while they are being repaired in an automobile body shop. The worktable includes parallel workpiece support arms which are disposed above a frame having horizontal upper and lower platforms separated by vertical spacing members. Various automobile body parts may be clamped to the support arms, thereby permitting a workman access to the entire workpiece. The frame is mounted on caster means which permit the worktable to be moved about the body shop. In order to provide a rigid workbench, the frame member has adjustable legs and a ratchet mechanism to selectively raise and lower the worktable frame so that the castor means can be disengaged from the shop floor when desired.

1 Claim, 3 Drawing Figures

Patented Sept. 5, 1972　　3,689,057

INVENTOR
BURTON E. WEBSTER
BY Jones and Lockwood
ATTORNEYS

AUTOMOBILE BODY WORKTABLE

BACKGROUND OF THE INVENTION

This invention relates to a worktable for supporting damaged automobile parts while they are being repaired, and more particularly to a worktable which can be used to transport the body parts from work station to work station in the body shop and then be converted to a rigid workbench at each station.

The ever-increasing amount of minor automobile accidents causing minor damage such as dented fenders, doors, bumpers and the like have so overloaded the automobile repair industry that many work-saving techniques and tools have been devised in order to save the mechanic time, thereby making the auto body repair shops more efficient. Although some automobile body parts may be repaired while remaining secured to the automobile frame, it is necessary to remove most of the body parts from the frame before they can be straightened and refinished.

Normally, removal of these auto body parts makes it much easier for the mechanic to work on the particular part; however, one of the primary difficulties in working on the detached parts is the fact that it is very difficult to hold and secure these parts in the proper position so they may be easily straightened, sanded, etc. A few fastening devices have been devised to permit such parts to be fastened directly to a workbench, but these devices have been found to be unacceptable because the mechanic or workman does not have access to the entire part without removing it from the fastening device and reversing its position. Furthermore, since straightening and refinishing operations are normally accomplished at different locations, transporting the detached parts has also been a problem because some of the parts are heavy and require several workmen to move the parts from one work station to another.

Therefore, a needs has existed for a movable worktable which will permit a detached automobile body part to be moved from one work station to the next while also permitting the table to convert to a rigid workbench so that the part is held securely and the workman can put whatever amount of force that is required to accomplish sanding, bending or refinishing operations. It is also necessary that the worktable permit the workman access to all areas of the auto body part without the necessity of reversing the part on the holding and supporting device, thus saving valuable time.

SUMMARY OF THE INVENTION

It is, therefore, an object of this invention to provide a movable worktable for a detachable automobile body part so that all portions of the part secured to the worktable are easily accessible to the workman.

Another object of this invention is to provide a workbench for automobile body parts wherein the part can be easily secured to the bench while a work operation such as sanding, repainting, etc., is being performed on the body part.

Still another object of this invention is to provide an automobile body worktable dolly which can be used to transport automobile parts being repaired from one work station to another.

Still another object of this invention is to provide a movable automotive body worktable which can be converted into a rigid workbench.

Still another object of this invention is to provide a combination automobile body workbench and transporting dolly which can be inexpensively manufactured.

These and other objects are accomplished by the present invention through the use of a table frame including a lower rectangular platform having four upright spacing members which carry a tool tray and jack support platform that is disposed parallel to the lower platform. Four casters are secured to the bottom surface of the lower platform, thereby permitting the frame to be moved over the floor. A pair of parallel support arms are disposed parallel to the tool tray platform. Each arm is secured to the upper end of two vertical support members which extend upwardly from the corners of the tool tray platform. Each support arm has a horizontal plate for receiving and permitting a workpiece to be clamped thereon.

Located at each corner of the table frame are adjustable legs which are secured to the respective spacing members of the frame. The adjustable legs include a tubular member which has an internally threaded casting secured to its lower end. Each of the tubular members has a shaft inserted therein, and the lower portion of the shaft is threaded so that it will engage the internally threaded casting on the lower end of the tubular member, thereby permitting the shaft to be raised and lowered as the shaft is rotated. When the shafts are rotated, so that they move downwardly, swivel pads which are secured to the lower end of each shaft contact the body shop floor.

A cover or chain housing secured to the side of the tool tray and support platform defines an inverted trough into which the upper ends of the shafts entered. One of the shaft members extends through a bearing in the horizontal top plate of the cover and receives a ratchet so that the shaft can be rotated. Thus, the ratchet shaft can be raised and lowered vertically as desired.

In order to permit the remaining shafts to be simultaneously raised and lowered with the ratchet shaft, a sprocket is secured to the ratchet shaft just below the bearing, and the remaining shafts have similar sprockets secured contiguous to their upper ends. The four sprockets are encircled by a chain, and they will move up and down with the chain within the inverted trough as the shafts are rotated. Thus, the remaining shafts are simultaneously moved upwardly or downwardly with the ratchet shaft. If the shafts are initially aligned vertically, the swivel pads on each of the shafts will contact the floor at the same time as the adjustable legs are lowered in order to raise the table. The casters on the lower platform will be disengaged from the floor, thereby forming a rigid workbench. As the adjustable legs are raised, the casters again contact the floor to permit the worktable to be moved over the floor.

BRIEF DESCRIPTION OF THE DRAWINGS

From the foregoing, additional objects, features and advantages of the invention will be apparent to those skilled in the art by the following detailed description of a preferred embodiment taken with the accompanying drawings, in which.

DESCRIPTION OF A PREFERRED EMBODIMENT

Figure 1:
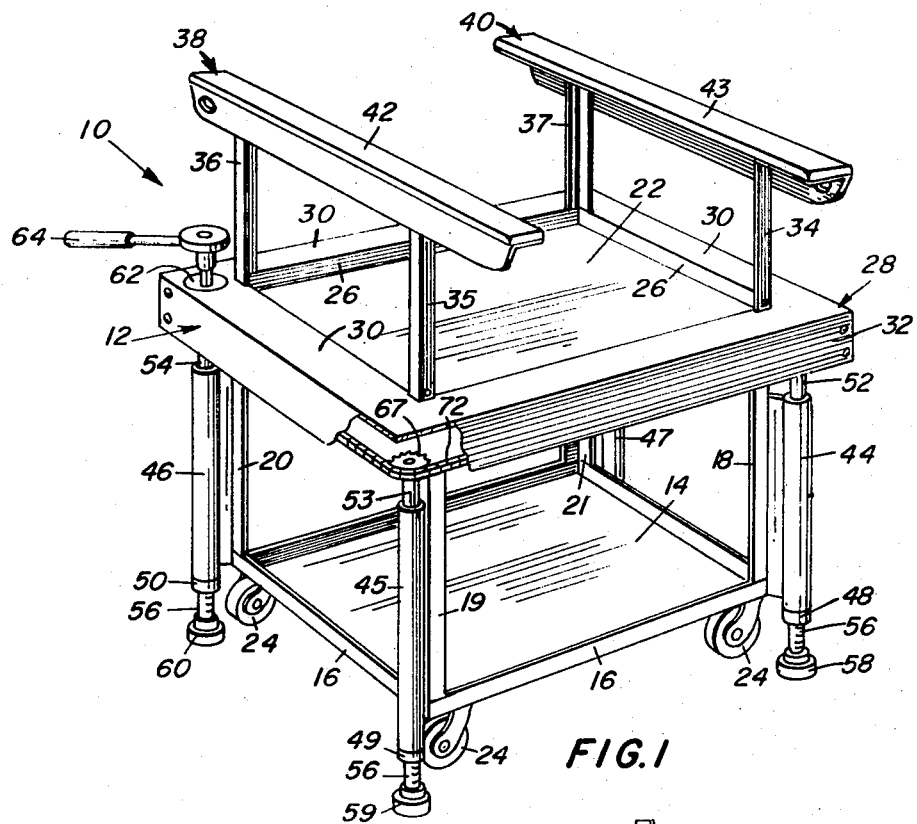
FIG. 1 is a perspective view of an automotive body worktable according to the present invention.

Referring more particularly to the drawings, in FIG. 1, the numeral 10 illustrates an automotive body worktable having a frame 12 which includes a lower platform 14 made of any suitable material such as plate steel. The lower platform 14 is generally rectangular in shape and is provided with upturned peripheral edges 16 which may be integrally formed with the lower platform, or the upturned edge can be a thin steel strip welded to the peripheral edge of the lower platform 14. At each corner of the lower platform 14 is a vertical spacing member 18, 19, 20 and 21, respectively, which is made of any suitable material such as standard angle iron. The spacing members extend upwardly and engage an upper platform 22 which is approximately the same size as the lower platform 14. The two platforms are disposed in a spaced parallel relationship. The upper platform 22 also has an upturned edge 26 similar to the upturned edge 16 of lower platform 14.

Figures 2, 3:
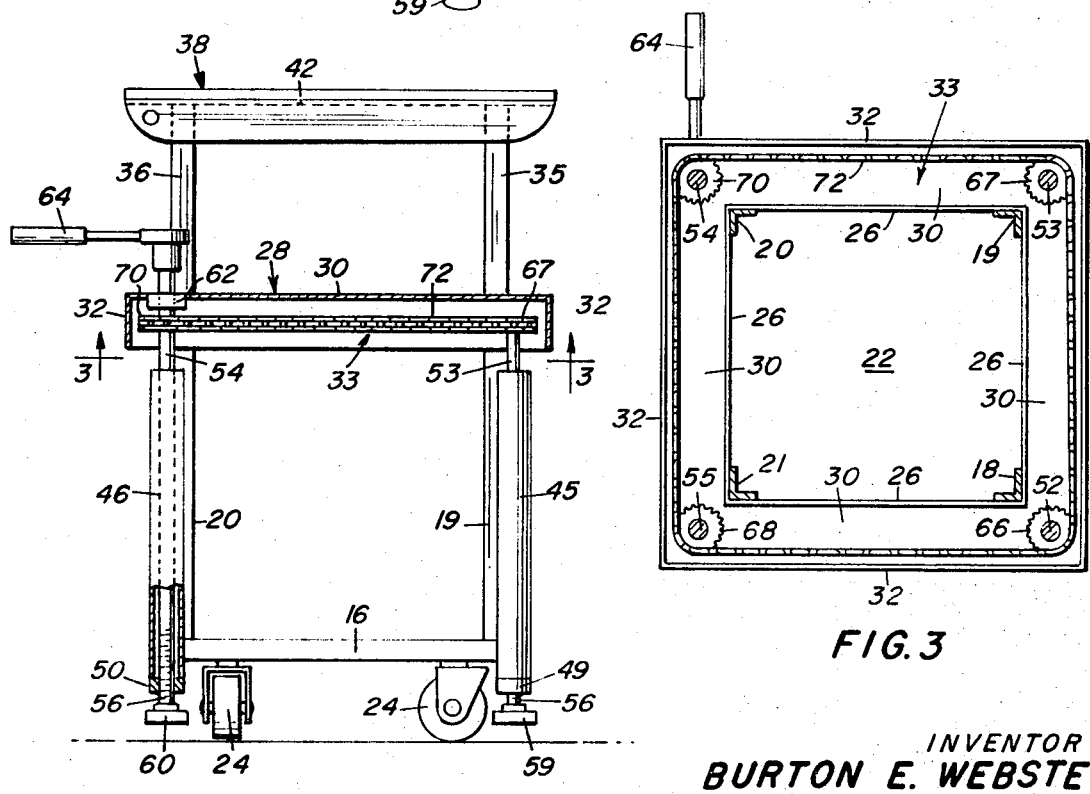
FIG. 2 is a side elevation view of the automotive body worktable having a portion of the skirt of the chain cover removed.
FIG. 3 is a section view showing a gear mechanism for the adjustable legs according to the present invention as taken on line 3—3 of FIG. 2.

Secured to the upper end of the ridge 26 of the upper platform 22 is a chain cover or housing 28. The cover has a horizontal top portion 30 which is parallel to the upper platform 22. The top portion 30 extends around the entire edge of the upper platform, and has a depending skirt 32 secured to its peripheral edge. An inverted trough 33 which opens downwardly is formed by the depending skirt 32, the horizontal top portion 30 and the ridge 26 of the upper platform 22, as can be seen in FIGS. 2 and 3.

In order to permit the frame to be moved over the floor of an auto body shop, the lower platform 14 has caster means 24 such as wheels, slides, or other suitable means secured to its bottom surface by bolting, riveting, welding or other suitable means. The caster means are pivotal so that the frame may be moved in any direction. Secured by any suitable means to each corner of upper platform 22 is a vertically disposed support member 34, 35, 36 and 37, such as standard angle sections. At the upper end of two adjacent vertical support members 35 and 36 is a workpiece support arm 38 which has a horizontal surface or plate that is parallel to the upper platform 22. The arm can be made of an angle section or other suitable material and may be secured to the vertical support members by suitable means. The remaining vertical support members 34 and 37 carry a second support arm 40 similar to arm 38 which is parallel to arm 38 and has a horizontal surface which is in approximately the same plane as the horizontal surface of support arm 38. The arms 38 and 40 will support automotive body parts such as doors, panels, bumpers, fenders, and the like and also permit then to be secured in a particular position by removable clamps and the like. The clamps prevent movement of the panel or part while it is being worked on. Normally, pads 42 and 43 of rubber, felt, or other suitable material are secured on the horizontal surface of the arms 38 and 40, respectively, so that the part will not be scratched or marred while it is being clamped to the arms or while it is being worked on.

In order to permit the movable worktable to be used as a rigid workbench, tubular members 44, 45, 46 and 47 are secured by any suitable means such as welding to the vertical spacing members 18, 19, 20 and 21, respectively, (see FIG. 1). The tubular members are disposed vertically, and in this preferred embodiment the upper ends of the tubular members are spaced a short distance below the edge of skirt 32 while the lower ends are spaced slightly below the plane of lower platform 14. Secured to the lower end of each of the tubular members 44, 45, 46 and 47 is a machine inner threaded casting 48, 49, 50 and 51 (not shown). If preferred, the casting can be eliminated, and a lower internal portion of the tubular member may be threaded. Each of the tubular members 44, 45, 46 and 47 has a shaft 52, 53, 54 and 55, respectively, inserted therein which has a threaded portion 56 extending upwardly from its lower end as can be seen in FIGS. 1 and 2. Swivel leg castings or swivel pads 58, 59, 60 and 61 (not shown) are secured to the lower end of each shaft 52, 53, 54 and 55, respectively. The shafts 52, 53, 54 and 55 extend upwardly beyond the upper end of the tubular members 44, 45, 46 and 47 and shafts 52, 53 and 55 terminate within the inverted trough 33 defined by the skirt 32 and upturned ridge 26 of the upper platform 22 (see FIG. 2). Shaft 54 extends through a bearing 62 in the horizontal plate 30 of the cover 28 and receives a ratchet 64, thus providing means to rotate shaft 54 and thereby move the leg vertically with respect to the frame 12.

In order to permit the platforms 14 and 22 of the frame 12 to remain horizontal and raise the entire worktable, the remaining shafts 52, 53 and 55 can be raised and lowered simultaneously with the movement of shaft 54. In FIGS. 2 and 3, it can be seen that a sprocket 66, 67 and 68 is secured contiguous to the end of each of shafts 52, 53 and 55, respectively, while another sprocket 70 is secured to shaft 54 just below bearing 62 (see FIG. 2). When the shafts are in the raised position as seen in FIG. 2, the upper ends of the shafts are positioned so that the sprockets 52, 53 and 55 are near horizontal plate 30 while the sprocket 70 is near the bearing 62. A chain 72 encircles the sprockets so that when shaft 54 is rotated by ratchet 64 the remaining shafts are rotated the same amount. Therefore, when it is desired to lift the movable table and make a rigid workbench, the ratchet 64 is operated so that shaft 54 is moved downwardly thus rotating sprocket 70 which, in turn, causes chain 72 to rotate the remaining sprockets 66, 67 and 68 an equivalent amount, thereby permitting the remaining shafts 52, 53 and 55 to be moved vertically in the same amount as shaft 54. Pads 58, 59, 60 and 61 on the shafts engage the floor simultaneously and lift the worktable vertically and platforms 14 and 22 remain horizontal. When the shafts are rotated, the entire shaft moves downwardly so that the ratchet 64 moves closer to the surface of plate 30 while the upper ends of the shafts move within the inverted trough away form the lower surface of horizontal plate 30.

The movable worktable or caddy described above can be used in various ways, for example, it can be used to secure dented automobile fenders, panels, and the like so they can be straightened and refinished. In use, the caddy receives an automobile panel which is secured to arms 38 and 40 by any suitable clamp means. The ratchet 64 is manipulated to raise the caddy to a rigid workbench position, thus permitting the body mechanic to perform various operations, such as hammering, sanding, etc. on the panel to straighten out the dent. After the panel is straightened, the mechanic manipulates ratchet 64 to lower the caddy to the movable position so that he can transport the panel to another work station where the panel may be primed and then painted. The caddy can also be used to straighten bent automobile bumpers. The procedure to straighten an automobile bumper is as follows: the caddy is positioned in the rigid workbench position, and the bumper is clamped to the horizontal arms 38 and 40. A jack is positioned on the upper platform 22 and is manipulated so that it engages the bumper. The jack will force the bumper upwardly and thereby straighten it. The caddy may be used as a platform for a workman when he is working on the top panel of a truck, van, or bus, and the upper and lower platforms 22 and 14 are normally used as tool trays.

It can be seen from the above description and the drawings that this invention provides a device which may be used as a transporting worktable and then converted into a rigid workbench. The movable worktable provides a means to move the workpiece from one station to another, while the rigid workbench provides a structure to which the workpiece can be clamped to permit the workman to perform certain operations such as sanding, painting, and the like. The device permits access to all parts of the workpiece, thereby saving the workman time by eliminating any repositioning of the workpiece. The simplicity of design of this device makes it inexpensive to manufacture.

The above embodiment can be modified in numerous ways as will be apparent from the foregoing. For example, it is within the skill of the art to vary the types of casters, to use different threading arrangements for the shafts and tubular members or to change the shape of the platforms. However, these and other variations and changes can be made in the invention as above described and illustrated without departing from the true spirit and scope thereof as defined by the following claims.

I claim
1. A worktable for use in transporting and straightening automobile body parts comprising;
   a. a rectangular lower platform;
   b. caster means rigidly secured to said lower platform;
   c. four vertical spacing members secured to the upper surface of said lower platform contiguous to its corners;
   d. an upper platform rigidly secured to the upper end of said spacing members, said upper platform including a bottom portion having an upturned edge which carries a horizontal outwardly extending top portion and a depending skirt, said upturn edge, top portion and depending skirt defining a cover portion;
   e. a pair of spaced parallel support arms carried on vertical uprights which are rigidly secured to said upper platform, said support arms being adapted to receive and support an automobile body part so that the part may be secured thereto to permit a workman to preform a desired operation, said upper platform being adapted to receive an additional mechanism used for straightening an automobile body part secured to said support arms;
   f. adjustable leg means secured to each of said vertical spacing members, said adjustable leg means including four tubular members having an internally threaded portion, a shaft carried in each of said tubular members for engaging the floor, each of said shafts having a threaded portion cooperating with the internal threaded portion of its respective tubular member, thereby permitting the vertical position of said shafts and said tubular members to be varied;
   g. a sprocket secured contiguous to the upper end of each of said shafts, said sprockets being within said cover portion of said upper platforms;
   h. a chain encircling said sprockets within said cover portion, whereby said shafts may be rotated simultaneously; and
   i. a ratchet secured to the upper end of one of said shafts for rotating said one shaft, whereby the remaining shafts will be rotated.

* * * * *